United States Patent
Lai (10) Patent No.: US 10,428,868 B2
(45) Date of Patent: Oct. 1, 2019

(54) BALL BEARING ASSEMBLY

(71) Applicant: SHINE YING CO., LTD, Hsinchu (TW)

(72) Inventor: Wen-Chen Lai, Hsinchu (TW)

(73) Assignee: SHINE YING CO., LTD, Hsinchu (TW)

( * ) Notice: Subject to any disclaimer, the term of this patent is extended or adjusted under 35 U.S.C. 154(b) by 0 days.

(21) Appl. No.: 15/867,320

(22) Filed: Jan. 10, 2018

(65) Prior Publication Data

US 2018/0128310 A1    May 10, 2018

Related U.S. Application Data

(63) Continuation-in-part of application No. 15/283,273, filed on Sep. 30, 2016, now abandoned.

(51) Int. Cl.
| | |
|---|---|
| *F16C 19/06* | (2006.01) |
| *F16C 33/38* | (2006.01) |
| *F16C 33/66* | (2006.01) |
| *F16C 33/60* | (2006.01) |
| *F16C 33/58* | (2006.01) |
| *F16C 19/50* | (2006.01) |
| *F16C 19/10* | (2006.01) |

(52) U.S. Cl.
CPC .............. *F16C 19/06* (2013.01); *F16C 19/10* (2013.01); *F16C 19/507* (2013.01); *F16C 33/3818* (2013.01); *F16C 33/3887* (2013.01); *F16C 33/583* (2013.01); *F16C 33/605* (2013.01); *F16C 33/6614* (2013.01); *F16C 33/6651* (2013.01); *F16C 33/6659* (2013.01); *F16C 2300/12* (2013.01); *F16C 2300/22* (2013.01); *F16C 2380/26* (2013.01)

(58) Field of Classification Search
CPC ...... F16C 13/006; F16C 19/06; F16C 19/507; F16C 33/605; F16C 33/583; F16C 33/3818; F16C 33/3887; F16C 33/6614; F16C 33/6651; F16C 33/6659
USPC ....... 384/475, 504, 505, 507, 513, 516, 529, 384/531
See application file for complete search history.

(56) References Cited

U.S. PATENT DOCUMENTS

| | | | | |
|---|---|---|---|---|
| 1,374,988 A | * | 4/1921 | Cooper ................... | F16C 33/60 384/505 |
| 1,492,672 A | * | 5/1924 | Brunner ................ | F16C 23/084 29/725 |
| 2,217,801 A | * | 10/1940 | Katcher ................... | F16C 33/60 384/475 |
| 2,983,557 A | * | 5/1961 | Blinder ............... | F16C 33/6677 384/475 |
| 3,722,968 A | * | 3/1973 | Bomberger ........... | F16C 13/006 384/492 |
| 4,334,720 A | * | 6/1982 | Signer ..................... | F16C 33/60 384/475 |
| 4,362,344 A | * | 12/1982 | Lederman ............. | F16C 19/166 384/482 |

(Continued)

FOREIGN PATENT DOCUMENTS

GB         936213 A  *  9/1963  ............. F01D 25/18

*Primary Examiner* — Marcus Charles
(74) *Attorney, Agent, or Firm* — Chun-Ming Shih (57) ABSTRACT

A ball bearing assembly includes at least two units being axially coupled together to allow at least one set of plural spherical balls adapted to be installed between at least one pair of two adjacent units of the at least two units.

20 Claims, 6 Drawing Sheets

(56) References Cited

U.S. PATENT DOCUMENTS

| | | | | |
|---|---|---|---|---|
| 4,603,983 A | * | 8/1986 | Hofmann | F16C 35/077 |
| | | | | 384/512 |
| 4,964,742 A | * | 10/1990 | Kagawa | F16C 33/60 |
| | | | | 384/492 |
| 5,106,209 A | * | 4/1992 | Atkinson | F16C 33/60 |
| | | | | 384/462 |
| 6,164,833 A | * | 12/2000 | Kai | F16C 19/54 |
| | | | | 384/518 |
| 6,935,443 B2 | * | 8/2005 | Ehler | E21C 25/18 |
| | | | | 175/371 |
| 8,672,555 B2 | * | 3/2014 | Gardelle | F16C 33/588 |
| | | | | 384/475 |
| 8,740,466 B2 | * | 6/2014 | Schwarzbich | F16C 27/04 |
| | | | | 384/537 |
| 2011/0240313 A1 | * | 10/2011 | Knobloch, Jr. | E21B 17/04 |
| | | | | 166/381 |

\* cited by examiner

BALL BEARING ASSEMBLY

FIELD OF THE INVENTION

The invention relates to a ball bearing assembly, particularly to a novel configuration of rolling balls with sustainable lubrication and motion mechanisms for improving performance under severe operating conditions.

BACKGROUND OF THE INVENTION

Various types of sliding bearings possessing self-lubricating feature have been developed. However, the sliding bearings usually fail to long-term operate under severe conditions, such as shaft rotating at high speed, heavy load and strong vibration. Such failures are mainly caused by lacking of structural strength and exhausting of lubricating media resulting in decreasing contact pressure and velocity (PV) limits, thus shaft could be directly contacted with axial hole to induce high frequency impacts, excessive wear and heat generation. In addition, poor initial running-in characteristics, deficiency of thrust load capacity and axial back-and-forth movement of the shaft are the industry urgent issues yet to be solved.

Ball bearings are generally formed by using the inner and outer races each with a raceway inside so that plural balls are interposed. According to applied load, the clearance between raceways is reduced in different degrees. Such effect will be occurred on each ball along the raceways rotation and revolution which will induce local excessive wear, grease away from the balls, loss of fitness, and ultimately cause failure. Other disadvantages include ball loading difficulty, limited number of balls to be placed in, high price, limited thrust load capacity, and weak structure. Thus long-term operation under the aforesaid severe conditions will face tough challenges.

SUMMARY OF THE INVENTION

The ball bearing assembly includes at least two units being axially coupled together between which at least one set of plural balls is installed to allow a rotatable shaft adapted to be run through.

The invention can notably provide many advantages, such as:

The assembly provides sustainable lubrication mechanism to replenish and recycle the lubricating media in storage chamber and abutting seats.

The assembly provides plural balls with good rolling performance to prevent excessive wear during the initial running-in process.

The assembly provides a vast amount and diversified lubricating media to optimize lubricity, upgrade operating limit and prolong service life.

The assembly is well suited for small precision motors to support high rotating speed miniature shaft and enhance heat dissipation.

The assembly provides fewer modularized units and can be singly formed by precision moulds to simplify mass production and reduce costs.

The assembly provides at least two units axially coupled in an abutting manner to achieve loading length extensibility and radial load uniformity.

The assembly provides at least one inner ring to be press-fitted and integrated with the shaft so that at least one circumferential groove of the at least one inner ring is rotatably engaged with the balls to smooth load distribution.

The assembly provides a superior motion mechanism of the ball to improve rolling freedom, reduce wear rate and uniform load allocation.

The assembly is more adaptable to pair with a novel three-section shaft to solve deficiency of the thrust load capacity and axial movement issues.

DETAILED DESCRIPTION

Figure 1:
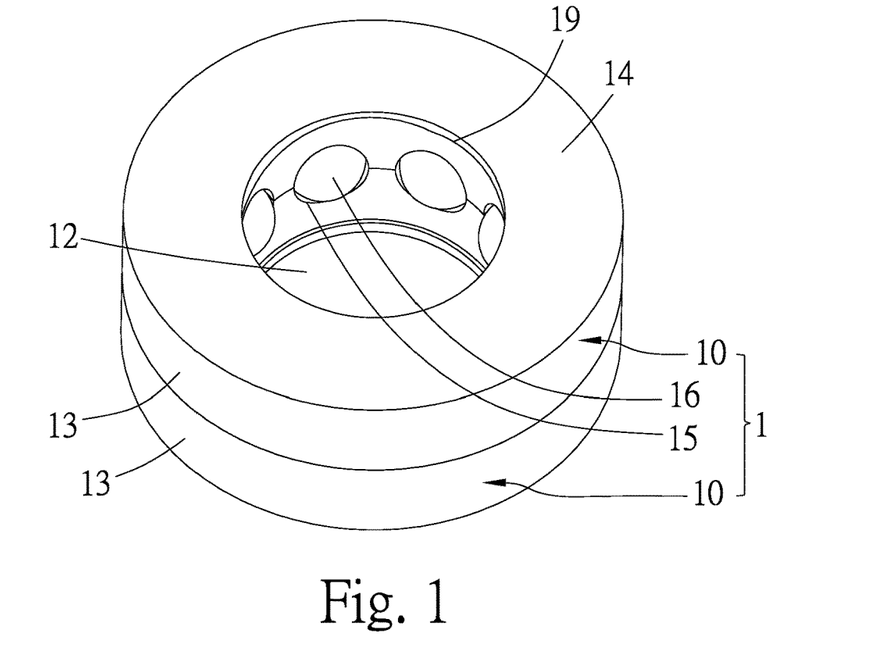
FIG. 1 is a perspective view of a ball bearing assembly of a first embodiment.
Figure 2:
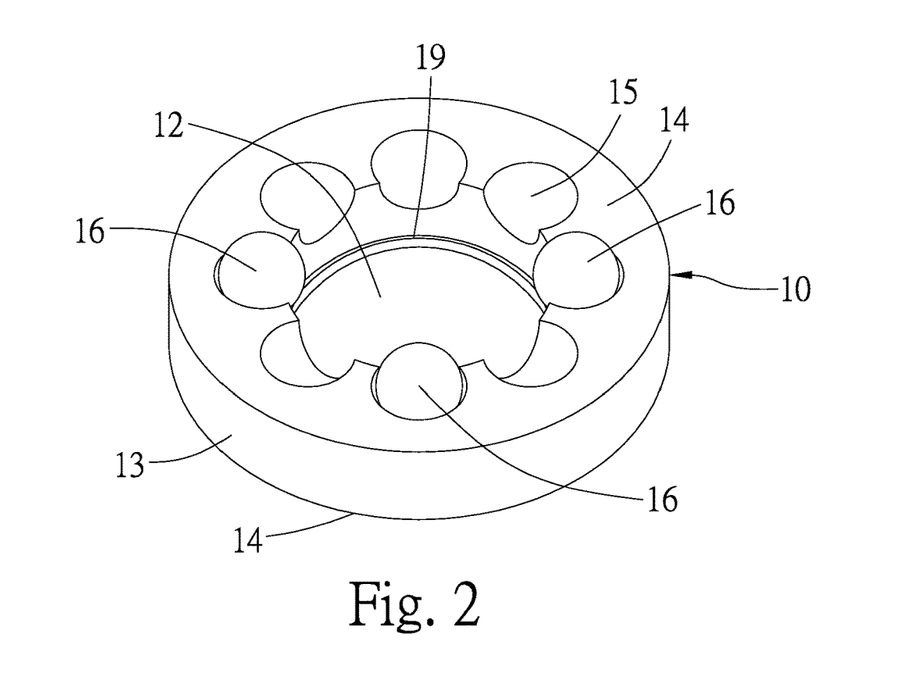
FIG. 2 is a perspective view of a unit (with partial number of balls) illustrated in FIG. 1.
Figure 3:
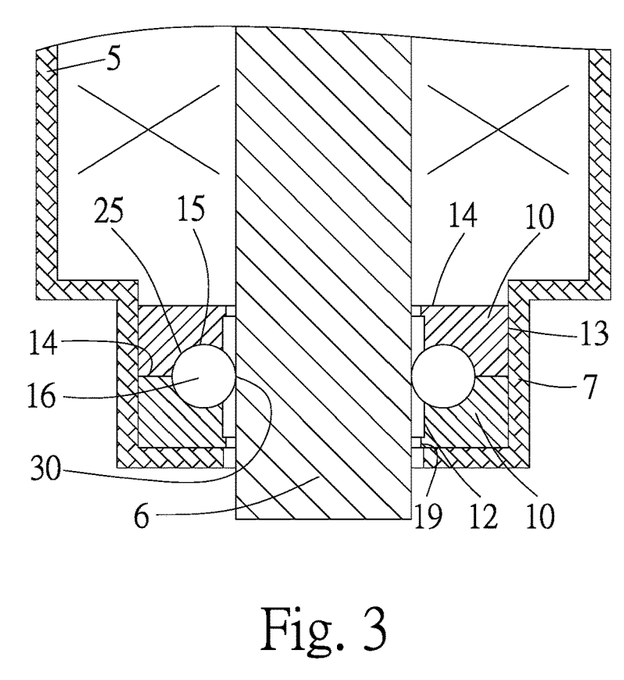
FIG. 3 is a sectional view of the ball bearing assembly illustrated in FIG. 1 installed on one end of a motor housing.

FIGS. 1-3 are a first embodiment of a ball bearing assembly comprising a bearing set 1 including two units 10 being axially coupled together between which plural spherical balls 16 are disposed therein.

Each unit 10 is made from a dense or porous material and includes an outer periphery forming a mounting portion 13, two ends forming two connection portions 14, a circular central hole 12 axially running through the two connection portions 14, and plural hemispherical seats 15 being concaved on a connection portion 14 concentric to the central hole 12 to allow each ball 16 inside the seat 15 adapted to be partially protruded from the central hole 12. The curvature of the seat 15 is conformed to that of the ball 16. Plural abutting seats 25 are formed by abutting two sets of plural seats 15 defined in two adjacent connection portions 14 between the two adjacent units 10 to allow the plural balls 16 adapted to be disposed therein. So that the bearing set 1 containing the plural balls 16 between the two adjacent units 10 forms the ball bearing assembly adapted to be run a shaft 6 through protruding surfaces of the plural balls 16. As such, even the shaft 6 is in direct contact with the plural balls 16 during a initial running-in process, the wear rate is much lower than that of the sliding bearing in which the shaft 6 is direct wear with a wall surface of the axial hole.

In practice, the invention can be applied to different devices; in various embodiments depicted herein a motor is used as the example to facilitate discussion. As such, the ball bearing assembly utilizes the mounting portion 13 to be press-fitted into an inner periphery of a jutting chamber 7 located at each end of a motor housing 5 in the art. Thus the shaft 6 can be run through two stationary ball bearing assemblies in the motor and supported by two sets of plural balls 16. In particular, compared with the traditional bearing assemblies having an outer shell, the ball bearing assembly is more adaptable to a small precision motor to support a high rotating speed miniature shaft 6. The jutting chamber 7 in such a motor is limited to a small space, which is better able to house the assembly without the outer shell. Providing the ball bearing assembly with a simple structure and few modularized units 10 in a compact state can enhance the heat dissipation and form a larger storage chamber 35 for more lubricating media storage which will be discussed in the following embodiments.

The unit 10 further includes a convex ring 19 formed on the central hole 12 with a radial height lower than that of vertexes of the protruding surfaces. Two convex rings 19 are preferably formed on both ends of the assembly so as to minimize ingress of foreign matter and lubricating media out of the assembly. The convex ring 19 can be formed on the unit 10 integrally or separately. The lubricating media means lubricating oil and lubricant such as grease or hybrid lubrication agent containing solid lubricating grains that have a higher viscosity than the lubricating oil.

The units 10 are most likely to be made through the powder metallurgy technology to simplify mass production and form a porous structure with good permeability of fluid. Therefore the required density and dimensional accuracy of the units 10 can be singly formed by precision moulds through stamping processes. The lubricating media can be applied through vacuum impregnated with lubricating oil in the capillaries of the units 10 and further the lubricant can be filled in the plural seats 15.

When the shaft 6 rotates, the lubricating media is expanded due to receiving heat generated by tribology points 30 between the shaft 6 and the protruding surfaces and tribology interfaces between the plural balls 16 and the plural abutting seats 25. As a result, the viscosity of the lubricating media reduces and fluidity increases, along with capillary force generated by the capillaries and centrifugal force generated by the rotating shaft, the lubricating media can be infiltrated out to the plural abutting seats 25. Through the rolling of the plural balls 16 in the plural abutting seats 25, the lubricating media in a form of liquid film is brought to the protruding surfaces so as to continuously replenish through the tribology points 30. Meanwhile, the surplus lubricating media on the protruding surfaces is brought back to the plural abutting seats 25 so as to recycle the lubricating media. Further, because each ball 16 is pivoted by the abutting seat 25 with good rolling performance causes the tribology point 30 on the ball 16 being constantly changing, so that the load on the shaft 6 can be shared more evenly by the balls 16. Thus local excessive wear on the surfaces of the balls 16 for the traditional ball bearing can be avoided. The aforesaid superior motion mechanism of the plural balls 16 in the robust plural abutting seats 25 provides strong support for the shaft 6 and can replenish and recycle the lubricating media to greatly prolong the service life.

Figure 4:
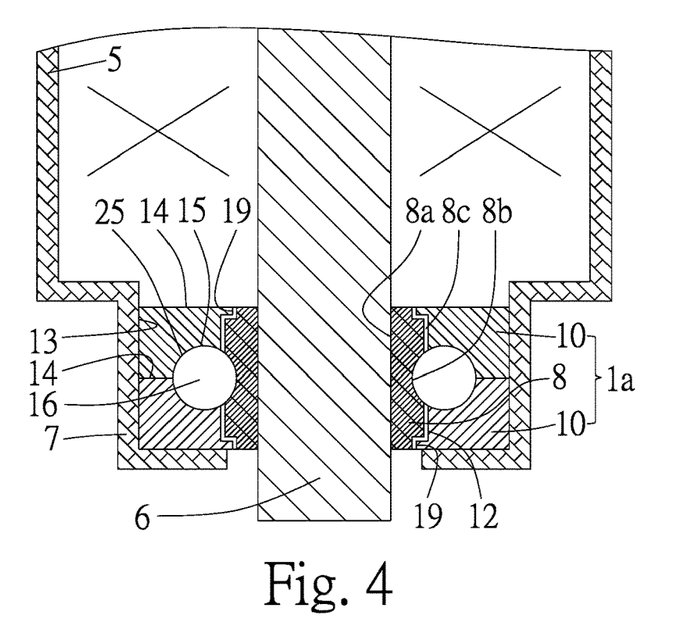
FIG. 4 is a sectional view of a ball bearing assembly with an inner ring installed on one end of a motor housing of a second embodiment.

FIG. 4 is a second embodiment of a ball bearing assembly. The main difference with the first embodiment is that a bearing set 1a of the ball bearing assembly further includes an inner ring 8 set in two central holes 12 of the two adjacent units 10. The inner ring 8 is a hollow cylinder with an axial through hole 8a adapted to be press-fitted and integrated with the rotatable shaft 6. A circumferential groove 8b with a radial sectional curvature conforming to that of the ball 16 is indented at the middle of an outer peripheral surface of the inner ring 8 so that the protruding surfaces of the plural balls 16 can be rotatably engaged with the circumferential groove 8b of the inner ring 8. The rest of the outer peripheral surface of the inner ring 8 is complementary to the surface of the two central holes 12, so that a gap 8c is formed between the inner ring 8 and the two central holes 12. In this embodiment, two convex rings 19 formed on the two central holes 12 are located at the opposite end of each central hole 12 respectively, so that a bended gap 8c is formed between the inner ring 8 and the two central holes 12. In practical applications, the gap 8c is usually narrowed as far as possible, for example, the gap 8c of the ball bearing assembly adapted for 5 mm shaft 6 should be within the range of 0.15-0.30 mm. In this way, there is no need to limit the radial height of the convex ring 19 lower than that of the vertexes of the protruding surfaces of the plural balls 16 as the first embodiment. The inner ring 8 of the invention can be made of dense material, which is more preferable to be made of high density oil containing porous material.

In operation, the inner ring 8 of the bearing assembly rotates along with the shaft 6, so that the plural balls 16 partially protruded from the two central holes 12 of the two adjacent units 10 which are fixed in the motor housing 5 can be rotatably engaged with the circumferential groove 8b of the inner ring 8 instead of contacting the plural balls 16 directly with the shaft 6 as shown in the first embodiment.

The present embodiment has at least the following advantages. First, the ball bearing assembly with the inner ring 8 can be more widely assembled on the shaft 6 of different materials supplied from different motor manufactures by increasing the strength of the inner ring 8 and the wear resistance between the inner ring 8 and the plural balls 16, which can be effectively achieved by the high density and oil containing porous inner ring 8. Second, compared to the point contact operation between the ball 16 and the rotating shaft 6, the rotary circumferential groove 8b of this embodiment provides a larger tribology interface for guiding the motion of the ball 16, in addition to reducing the impact of load stress on fatigue strength and local wear of the material, the rotary circumferential groove 8b that guides the motion of the balls 16 can increase the number of balls 16 sharing the load at any operation moment to achieve the effectiveness of the distributed load. Third, because the size of the gap 8c can be completely controlled in advance by the ball bearing assembly itself without the influence of the external motor. Providing the gap 8c with a bended narrow cylindrical clearance is beneficial not only for dustproof but also for replenishing and recycling of the lubricating oil to achieve long-term continuous lubrication. That is, when the shaft 6 is rotated at a high speed along with the temperature rise, the lubricating oil stored in the porous inner ring 8 and the two adjacent units 10 can be supplied to the tribology interface of the balls 16 and retained in the gap 8c to prevent oil leakage and optimize lubricity; and when the rotating speed of the shaft 6 is reduced or the operation is stopped, the lubricating oil in the gap 8c will be sucked back to the pores of the inner ring 8 and the two adjacent units 10 along with the temperature drop.

Figure 5:
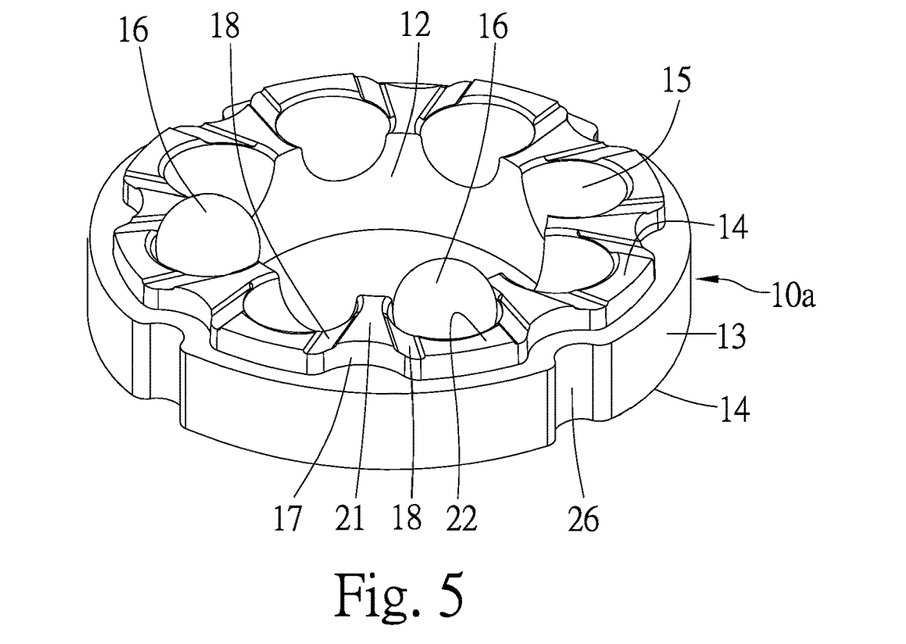
FIG. 5 is a perspective view of a unit (with partial number of balls) of a third embodiment.
Figure 6:
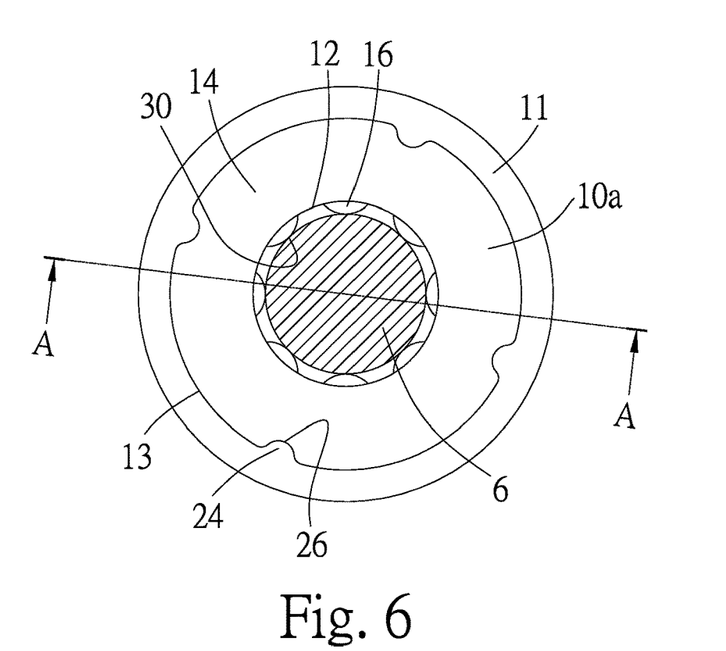
FIG. 6 is a top view of a ball bearing assembly (with a shaft) of the third embodiment.
Figure 7:
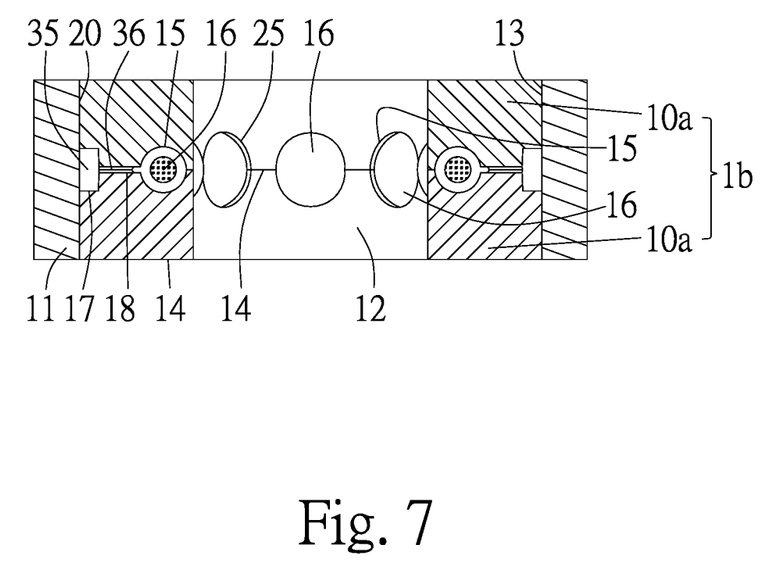
FIG. 7 is a sectional view along A-A direction of the ball bearing assembly (without a shaft) illustrated in FIG. 6.

FIGS. 5-7 are a third embodiment of a ball bearing assembly comprising a casing 11 and a bearing set 1b. The casing 11 is made from a dense or porous material and forms a hollow tube with an axial cavity 20 inside. The cavity 20 also includes at least one axially extended rib 24. The bearing set 1b includes two units 10a being axially coupled together to allow the plural balls 16 adapted to be disposed within the two units 10a.

The unit 10a differs from the unit 10 mainly in that the unit 10a includes a groove 17 and plural notches 18 being formed respectively on the connection portion 14 in which the plural seats 15 are defined. The groove 17 is indented towards and through the mounting portion 13. The plural notches 18 are indented to communicate with the plural seats 15 and the groove 17. As such, plural partitions 21 and plural diaphragms 22 are formed on the connection portion 14. After placing the plural balls 16 into the plural seats 15, the corresponding two adjacent partitions 21 and two adjacent diaphragms 22 between the two adjacent units 10a are in contact with each other to form the bearing set 1b, and the corresponding two adjacent seats 15 and two adjacent notches 18 are respectively forming plural abutting seats 25 and plural passages 36.

The mounting portion 13 is formed in a shape and size mating the cavity 20 so that the bearing set 1b can be press-fitted into and integrated with the casing 11. In addition, the mounting portion 13 sets at least one slot 26 formed axially thereon to latch on the corresponding at least one rib 24 of the cavity 20. Similarly, the slot 26 may also be formed on the cavity 20 to latch on the corresponding rib 24 formed on the mounting portion 13. Further optimizes precise positioning and structural robustness of the ball bearing assembly. As such, a storage chamber 35 is defined within the cavity 20 around two adjacent grooves 17 for storing more lubricating media and communicating with the plural abutting seats 25 via the plural passages 36. Providing the ball bearing assembly with a sustainable lubrication mechanism can replenish and recycle the lubricating media within the plural abutting seats 25 for even distribution on the tribology points 30, which is further beneficial to reduce noise, improve load capacity and anti-vibration capability, and prolong the service life.

The lubrication mechanism is also adaptable to be formed by at least one groove 17 and at least one set of plural notches 18 being indented respectively on at least one of the two adjacent connection portions 14 in which the plural abutting seats 25 are defined. The at least one groove 17 is arranged away from the mounting portion 13 and the at least one set of plural notches 18 is arranged in fluid communication with the plural seats 15 and the at least one groove 17. So that the storage chamber 35 and the plural passages 36 can be formed respectively by the at least one groove 17 and the at least one set of plural notches 18, thereby similar to the first embodiment without the casing 11 also can facilitate the lubrication mechanism. In the same way, the inner ring 8 can also be set in the central holes 12 of the two adjacent units 10a to achieve the same effectiveness as the second embodiment.

Figure 8:
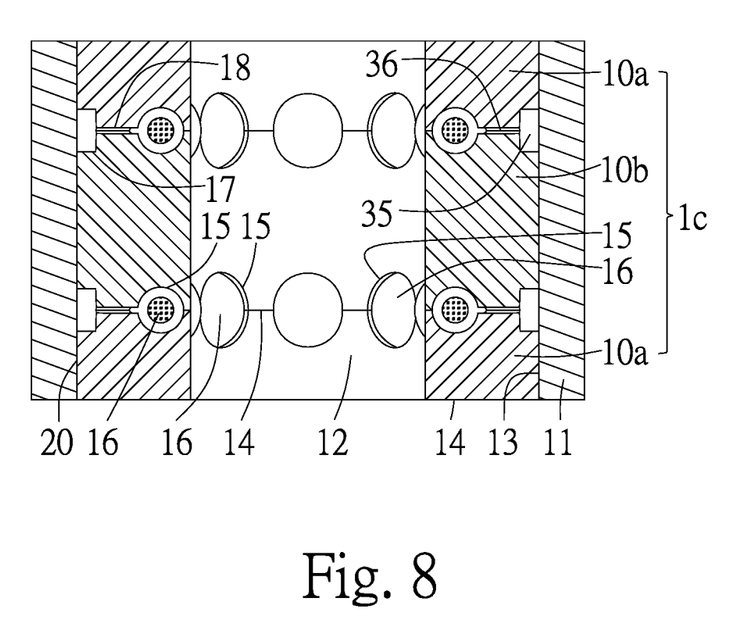
FIG. 8 is a sectional view of a ball bearing assembly of a fourth embodiment.

FIG. 8 is a fourth embodiment to illustrate the loading length extensibility of the ball bearing assembly. A bearing set 1c includes two types of the units 10a and 10b arranged in two pairs of two adjacent units (10a, 10b) and (10b, 10a) between which a set of plural balls 16 is installed respectively. The bearing set 1c is press-fitted into and integrated with the casing 11 via the mounting portion 13 of the three units 10a, 10b, 10a forming the ball bearing assembly. The configuration on the two connection portions 14 of the middle unit 10b is the same as on the adjacent connection portion 14 of the upper and lower units 10a. Thereby the ball bearing assembly possesses two sets of lubrication mechanisms for allowing the lubricating media in the two storage chambers 35 via the two sets of plural passages 36 into the two sets of plural abutting seats 25 to lubricate the two sets of plural balls 16 therein and the rotating shaft 6. Compared with the previous embodiments, the loading length can be extended to share heavier loads by the two sets of plural balls 16; the storage capacity of the lubricating media is doubled and the tribology points 30 are more evenly distributed along the shaft 6.

The loading length extensibility for the ball bearing assembly is further illustrated in accordance with different stack modes of the four units 10, 10a, and 10b. For example, a stack of the arrangement shown in FIG. 8 can be adopted by the two types of the units 10a, 10b to form three pairs of two adjacent units (10a, 10b), (10b, 10b) and (10b, 10a). As such, the ball bearing assembly possesses three sets of lubrication mechanisms. Also for example, the stack of the arrangement shown in FIG. 8 can still be adopted by the two types of the units 10, 10b to form three pairs of two adjacent units (10, 10b), (10b, 10b) and (10b, 10), only the slots 26 need to be set on the mounting portion 13 of the unit 10 or remove the slots 26 from the unit 10b to coincide with each other. As such, the ball bearing assembly possesses three sets of lubrication mechanisms. The difference with the preceding example appeared in (10, 10b) and (10b, 10) is that the capacity of each storage chamber 35 and the equivalent hydraulic diameter of each set of plural passages 36 are reduced by half.

Accordingly, a desirable loading length of the ball bearing assembly can be realized by axially coupling of at least two units, regardless of whether the ball bearing assembly has the casing 11 or not, and is adaptable to any unit disclosed in the invention to make possible combinations, including the groove 17 and the notches 18 with differences in shape, size, number and position and also the unit 10 not having the groove 17 and the notches 18. Similarly, the inner ring 8 can be further set in the central holes 12 of each pair of two adjacent units in the embodiment to achieve the same effectiveness as the second embodiment.

Figure 9:
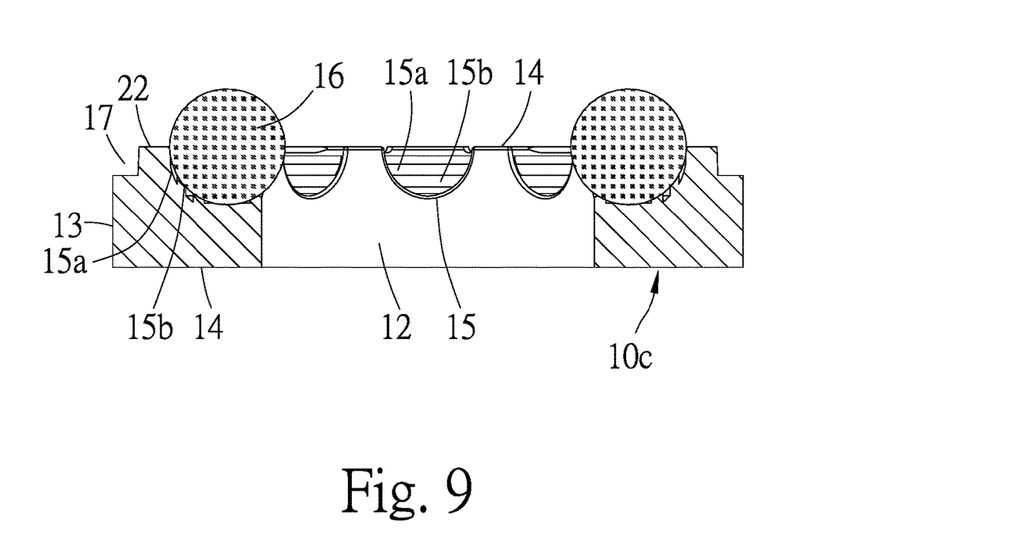
FIG. 9 is a sectional view of a unit (with partial number of balls) of a fifth embodiment.

FIG. 9 is a fifth embodiment to enhance the rolling performance of the ball 16. It differs from the previous embodiments mainly in that each seat 15 of a unit 10c is formed by retaining only a partial spherical surface with curvature conforming to that of the ball 16 and arranged as plural strips interval distributed spherical regions 15b. A remaining surface of the seat 15 is set to plural concave regions 15a with radial dimension larger than that of the plural spherical regions 15b. By limiting the area of the tribology interface between the ball 16 and the seat 15 can reduce rolling friction. Meanwhile, the lubricating media become easier to reside in the concave regions 15a around the spherical regions 15b to lubricate the ball 16 promptly, thereby enhancing the rollability of the ball 16.

Figure 10:
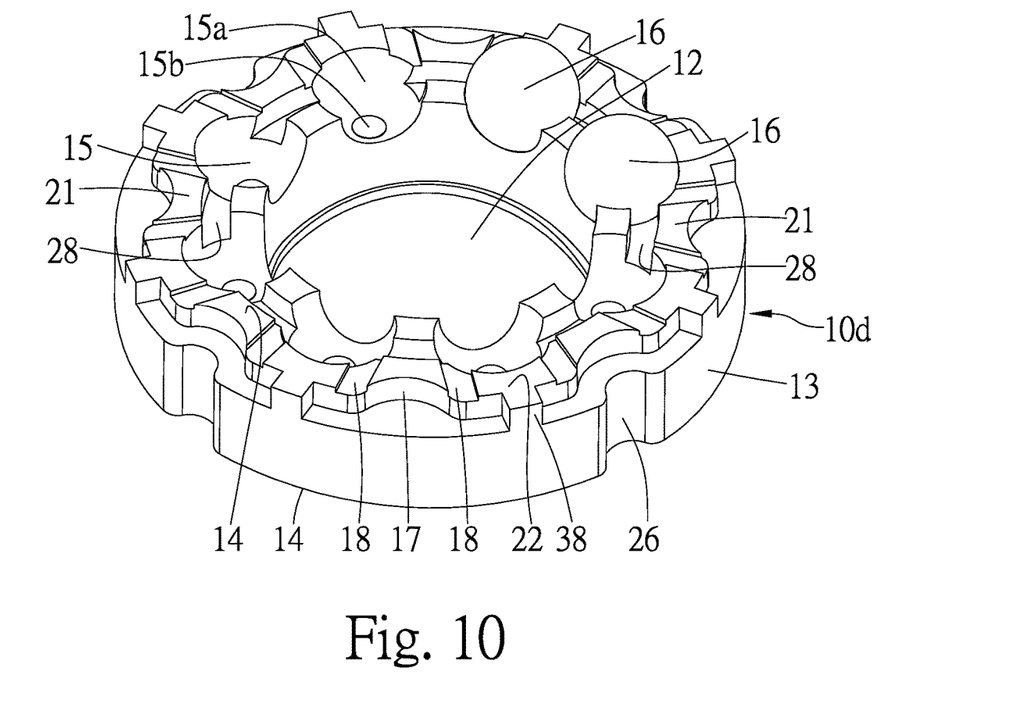
FIG. 10 is a perspective view of a unit (with partial number of balls) of a sixth embodiment.
Figure 11:
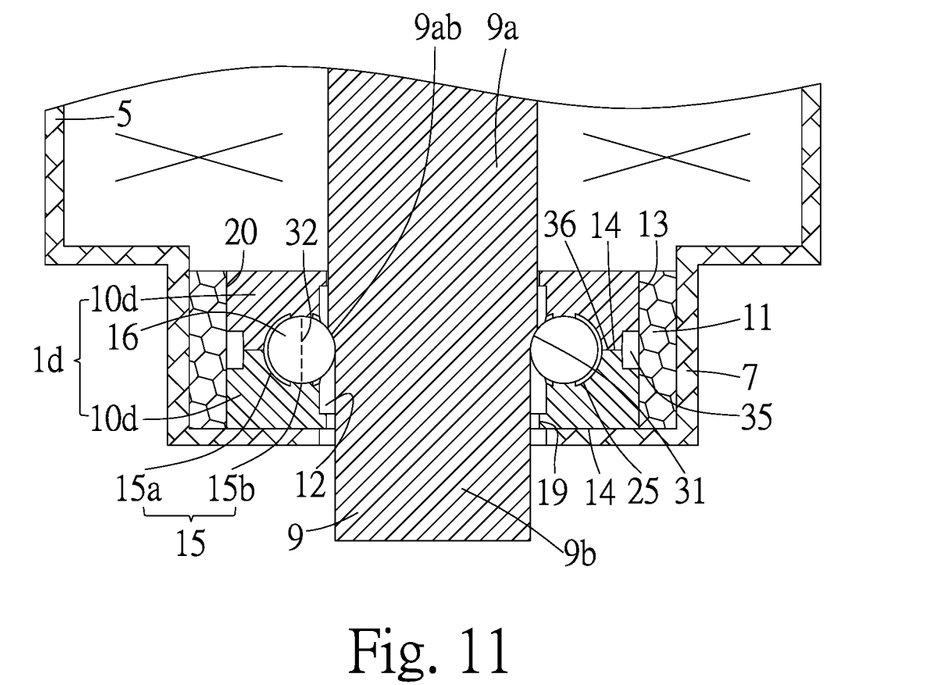
FIG. 11 is a sectional view of a ball bearing assembly installed on one end of a motor housing of the sixth embodiment.

FIGS. 10-11 are a sixth embodiment of a ball bearing assembly comprising a casing 11 and a bearing set 1d which includes two units 10d being axially coupled together to allow the plural balls 16 adapted to be disposed within the two adjacent units 10d to further improve the rolling performance of the ball 16, and disclose a novel three-section shaft 9 so as to pair with the assembly to solve the industry long-term urgent issues that the existing motor shaft 6 run through traditional bearings appears deficiency of thrust load capacity and axial movement of the shaft 6. The main differences with the previous embodiments are described as follows.

Firstly, plural tendons 38 are set in the groove 17 to enhance structural strength of a unit 10d shown in FIG. 10 and divide the groove 17 into plural smaller grooves 17. Further, plural concave channels 28 are respectively arranged in fluid communication with each pair of two neighboring seats 15 of the set of plural seats 15. Thereby the lubricating media can be filled with both the storage chamber 35 and spaces formed by channels 28 to further optimize the lubricity of the nearby seats 15, increase the lubricating media storage, and extend the service life of the ball bearing assembly.

Secondly, the spherical region 15b defined in the unit 10d retains at least one spherical surface on the bottom of the seat 15 with surface area within 20% that of the seat 15 and sets remaining surface as the concave region 15a. As such, each ball 16 in the abutting seat 25 can be held and supported freely by two spherical pivots through a central axis 32 aligned with centers of the two spherical regions 15b. The so-called "held and supported" refers to that the position of the ball 16 surface relative to the two spherical regions 15b is changing at any instant. Thus the motion of each ball 16 is pivoted through the central axis 32 which is also automatic centering a rotation axis of the ball 16. In the following, first uses a traditional shaft 6 to explain the motion mechanism of the ball 16. Due to the axis of the shaft 6 in parallel with the central axis 32, a tangential force of the shaft 6 applied to the tribology point 30 (see FIG. 3) is perpendicular to the rotation axis of the ball 16 causing the ball 16 not only rotation but also rolling. The motion of each ball 16 is not like a globe that is fixedly pivoted to the South and North poles, but rotates around its sphere center through multi-axis alternately to auto-align with the central axis 32 at any instant to achieve the best state of the tribology point 30 with minimum friction between the ball 16 and the shaft 6. According to the aforesaid excellent rollability of the novel ball 16 motion mechanism, the tribology point 30 may occur anywhere on the ball 16 surface to improve rolling freedom, uniform load allocation, and minimize wear rate of the ball 16.

Thirdly, as shown in FIG. 11, after fixing each ball bearing assembly on each of two ends of the motor housing 5, the three-section shaft 9 is run through two sets of plural balls 16 of the two ball bearing assemblies. The three-section shaft 9 includes a larger section 9a, two curved sections 9ab, and two smaller sections 9b. The larger section 9a is defined between the two sets of plural balls 16, and incapable of running through an opening formed by the protruding surfaces of the set of plural balls 16. The two curved sections 9ab are respectively defined between the larger section 9a and each smaller section 9b, and close against between lateral side surfaces of the two sets of plural balls 16 with curvature conforming to that of the protruding surfaces and forming two sets of tribology curves 31. The two smaller sections 9b are respectively defined in extending from each end of the two curved sections 9ab, and with a diameter fitting just right for running through the opening. Thus the shaft 9 can be achieved by running each smaller section 9b through the set of plural balls 16 of each ball bearing assembly, until the two curved sections 9ab are close against the two sets of plural balls 16.

Similarly, the three-section shaft 9 also can be achieved by running each smaller section 9b through two sets of plural balls 16 of each ball bearing assembly shown in FIG. 8, until the two curved sections 9ab are close against two closest sets of plural balls 16 which respectively belongs to each ball bearing assembly. As such, the larger section 9a is defined between the two closest sets of plural balls 16.

When the three-section shaft 9 rotates, by means of the two curved sections 9ab leaning against the two closest sets of plural balls 16, effectively eliminates the three-section shaft 9 axial movement clearance and strongly supports the axial load applied to the three-section shaft 9. In addition, the two curved sections 9ab apply tangential force on the two sets of tribology curves 31 causing the rolling angle of the ball 16 more susceptible to change. Thus the three-section shaft 9 provides the ball 16 more rolling freedom and flexible tribology positions conversion to further optimize rollability of the ball 16.

Accordingly, the three-section shaft 9 is clearly applicable to pair with the ball bearing assembly formed by axially coupling of the at least two units 10, 10a, 10b, 10c, 10d between which at least one set of plural balls 16 is installed. Thereby the industry long-term urgent issues relating to poor initial running-in characteristics, deficiency of the thrust load capacity, and axial back-and-forth movement can be effectually solved at once.

Further, the unit 10, 10a, 10c, 10d with the seat 15 facing the cavity 20 can be integrally formed with an inner surface of the casing 11 at one end via the mounting portion 13 to reduce component number and simplify fabrication process for structural robustness and mass production.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A ball bearing assembly, comprising:
a bearing set including at least two units being axially coupled together to allow at least one set of plural spherical balls adapted to be installed between at least one pair of two adjacent units of the at least two units, each unit including two ends forming two connection portions, at least one of the two connection portions being axially connected with an adjacent unit of the at least two units, an outer periphery forming a mounting portion, a circular central hole axially running through the two connection portions;
wherein at least one set of plural hemispherical seats is concaved on the at least one of the two connection portions concentric to the central hole to allow each ball inside the seat adapted to be partially protruded from the central hole forming protruding surfaces of the at least one set of plural balls, at least one set of plural abutting seats being formed by abutting two sets of plural seats defined in two adjacent connection portions between the at least one pair of two adjacent units to allow the at least one set of plural balls to be disposed therein, so that the ball bearing assembly is adapted to be run through a rotatable shaft.

2. The ball bearing assembly of claim 1, wherein at least one groove and at least one set of plural notches are indented respectively on at least one of the two adjacent connection portions between the at least one pair of two adjacent units, the at least one groove forming at least one storage chamber to store lubricating media therein, the at least one set of plural notches communicating with the at least one set of plural seats and the at least one groove and forming at least one set of plural passages to communicate with the at least one set of plural abutting seats and the at least one storage chamber.

3. The ball bearing assembly of claim 2, wherein the at least one groove is indented from the at least one of the two adjacent connection portions either towards and through the mounting portion or away from the mounting portion.

4. The ball bearing assembly of claim 2, wherein at least one tendon is set in the at least one groove.

5. The ball bearing assembly of claim 1, wherein the curvature of the seat is conformed to that of the ball.

6. The ball bearing assembly of claim 1, wherein each of at least one seat of the at least one set of plural seats contains at least one partial spherical surface with curvature conforming to that of the ball, and sets remaining surface of each of the at least one seat with radial dimension larger than that of the at least one partial spherical surface.

7. The ball bearing assembly of claim 6, wherein the at least one partial spherical surface is arranged on a bottom of each of the at least one seat with surface area within 20% that of each of the at least one seat.

8. The ball bearing assembly of claim 1, wherein at least one concave channel is arranged in fluid communication with at least one pair of two neighboring seats of the at least one set of plural seats.

9. The ball bearing assembly of claim 1, wherein the rotatable shaft is adapted to be run through the protruding surfaces.

10. The ball bearing assembly of claim 1, wherein the shaft adapted to be run through two ball bearing assemblies is a three-section shaft including a larger section, two curved sections, and two smaller sections,
the larger section is defined between two closest sets of plural balls which respectively belongs to each ball bearing assembly, and incapable of running through at least one opening formed by the protruding surfaces,
the two curved sections are respectively defined between the larger section and each smaller section, and close against between lateral side surfaces of the two closest sets of plural balls, and
the two smaller sections are respectively defined in extending from each end of the two curved sections, and with a diameter fitting just right for running through the at least one opening.

11. The ball bearing assembly of claim 1, wherein the assembly includes a casing which is a hollow tube with an axial cavity inside, and the mounting portion is formed in a shape and size mating the cavity, so that the bearing set can be press-fitted into and integrated with the casing.

12. The ball bearing assembly of claim 11, wherein the cavity has at least one rib formed axially thereon to latch on the corresponding at least one slot formed on the mounting portion, or the cavity has at least one slot formed axially thereon to latch on the corresponding at least one rib formed on the mounting portion.

13. The ball bearing assembly of claim 11, wherein a unit of the at least two units with the seat facing the cavity is integrally formed with an inner surface of the casing at one end via the mounting portion.

14. The ball bearing assembly of claim 1, wherein at least one unit of the at least two units includes at least one convex ring on the central hole with a radial height lower than that of vertexes of the protruding surfaces.

15. The ball bearing assembly of claim 1, wherein the bearing set includes at least one inner ring, each inner ring is a hollow cylinder set in two central holes of each pair of two adjacent units, an axial through hole of each inner ring is adapted to be press-fitted and integrated with the rotatable shaft.

16. The ball bearing assembly of claim 15, wherein a circumferential groove with a radial sectional curvature conforming to that of the ball is indented at the middle of an outer peripheral surface of each inner ring, so that the protruding surfaces of the at least one set of plural balls can be rotatably engaged with at least one circumferential groove of the at least one inner ring, and the rest of the outer peripheral surface of each inner ring is complementary to the surface of the two central holes, so that a gap is formed between each inner ring and the two central holes.

17. The ball bearing assembly of claim 16, wherein at least one convex ring is formed on at least one of the two central holes, so that a bended gap is formed between each inner ring and the two central holes.

18. A ball bearing assembly, comprising:
a casing being a hollow tube with an axial cavity inside; and
a bearing set including at least two units being axially coupled together to allow at least one set of plural spherical balls adapted to be installed between at least one pair of two adjacent units of the at least two units, each unit including two ends forming two connection portions, at least one of the two connection portions being axially connected with an adjacent unit of the at least two units, a circular central hole axially running through the two connection portions, and an outer periphery of the unit forming a mounting portion which is formed in a shape and size mating the cavity so that the bearing set can be press-fitted into and integrated with the casing;
wherein at least one set of plural hemispherical seats is concaved on the at least one of the two connection portions concentric to the central hole to allow each ball inside the seat adapted to be partially protruded from the central hole, at least one set of plural abutting seats being formed by abutting two sets of plural seats defined in two adjacent connection portions between the at least one pair of two adjacent units to allow the at least one set of plural balls to be disposed therein, each seat with curvature conforming to that of the ball, at least one groove and at least one set of plural notches being indented respectively on at least one of the two adjacent connection portions between the at least one pair of two adjacent units, the at least one groove forming at least one storage chamber to store lubricating media therein, the at least one set of plural notches communicating with the at least one set of plural seats and the at least one groove and forming at least one set of plural passages to communicate with the at least one set of plural abutting seats and the at least one storage chamber, so that the ball bearing assembly is adapted to be run a rotatable shaft through protruding surfaces of the at least one set of plural balls.

19. The ball bearing assembly of claim 18, wherein the rotatable shaft adapted to be run through two ball bearing assemblies is a three-section shaft including a larger section, two curved sections, and two smaller sections,
the larger section is defined between two closest sets of plural balls which respectively belongs to each ball bearing assembly, and incapable of running through at least one opening formed by the protruding surfaces,
the two curved sections are respectively defined between the larger section and each smaller section, and close against between lateral side surfaces of the two closest sets of plural balls, and
the two smaller sections are respectively defined in extending from each end of the two curved sections, and with a diameter fitting just right for running through the at least one opening.

20. A ball bearing assembly, comprising:
a casing being a hollow tube with an axial cavity inside; and
a bearing set including at least two units and at least one inner ring, the at least two units being axially coupled together to allow at least one set of plural spherical balls adapted to be installed between at least one pair of two adjacent units of the at least two units, each unit including two ends forming two connection portions, at least one of the two connection portions being axially connected with an adjacent unit of the at least two units, a circular central hole axially running through the two connection portions, and an outer periphery of the unit forming a mounting portion which is formed in a shape and size mating the cavity, each inner ring being a hollow cylinder set in two central holes of each pair of two adjacent units, the inner ring including an axial through hole adapted to be press-fitted and integrated with a rotatable shaft, a circumferential groove with a radial sectional curvature conforming to that of the ball being indented at the middle of an outer peripheral surface of each inner ring so that each set of plural balls can be rotatably engaged with the circumferential groove of the inner ring, and the rest of the outer peripheral surface of each inner ring is complementary to the surface of the two central holes so that a gap is formed between each inner ring and the two central holes, the bearing set being press-fitted into and integrated with the casing;

wherein at least one set of plural hemispherical seats is concaved on the at least one of the two connection portions concentric to the central hole to allow each ball inside the seat adapted to be partially protruded from the central hole, at least one set of plural abutting seats being formed by abutting two sets of plural seats defined in two adjacent connection portions between the at least one pair of two adjacent units to allow the at least one set of plural balls to be disposed therein, each seat with curvature conforming to that of the ball, at least one groove and at least one set of plural notches being indented respectively on at least one of the two adjacent connection portions between the at least one pair of two adjacent units, the at least one groove forming at least one storage chamber to store lubricating media therein, the at least one set of plural notches communicating with the at least one set of plural seats and the at least one groove and forming at least one set of plural passages to communicate with the at least one set of plural abutting seats and the at least one storage chamber, so that the ball bearing assembly is adapted to be run the rotatable shaft through the at least one inner ring with protruding surfaces of the at least one set of plural balls rotatably engaged with at least one circumferential groove.

* * * * *